Figure 1:
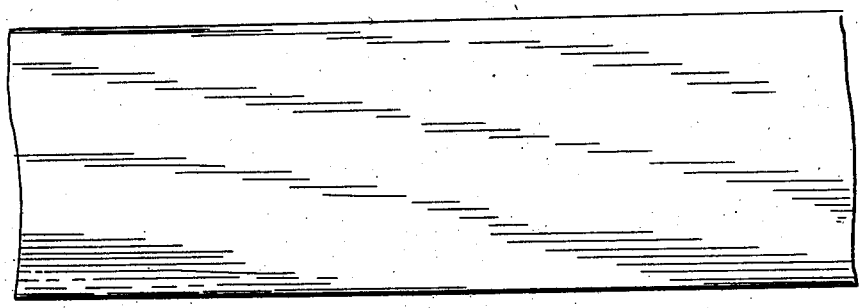
Figure 1:
Figure 1:
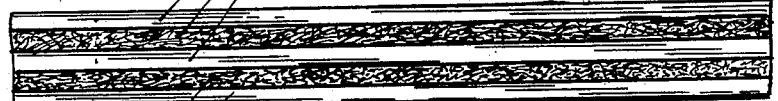
Figure 1:
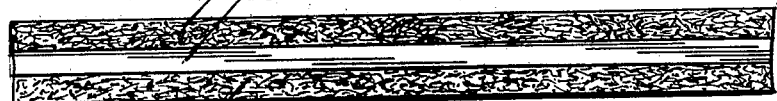
Figure 1:

April 22, 1930. J. J. HINDE 1,755,781
INSULATING LUMBER OR WALL BOARD
Filed July 22, 1926

Inventor
James J. Hinde
by
Attorney

Patented Apr. 22, 1930

1,755,781

UNITED STATES PATENT OFFICE

JAMES J. HINDE, OF SANDUSKY, OHIO

INSULATING LUMBER OR WALL BOARD

Application filed July 22, 1926. Serial No. 124,276.

The invention relates to the manufacture of laminated insulating lumber or wallboard, formed from fibrous vegetable growth, which may be obtained from waste farm material or from growth in the form of cornstalks, straw or weeds such as milkweed, saw grass or sun flowers or other plants, or from growths especially cultivated for this use or obtained from by-products in the manufacture of other articles including cotton and tobacco stalks or other fibrous plants that would otherwise go to waste. These vegetable growths contain a natural sap full of cementitious material or gummy substances such as the latex of the rubber tree or milkweed, or of many other plants, or the saccharine content of cornstalks, including sorghum and broom corn, which are employed in binding the fibrous substance of which the wallboard is composed together, and any excess of this viscous or saccharine material will be conserved for other uses.

The particular product comprised in the improvement contemplated, consists in a wallboard or building lumber composed of alternate layers of soft, pithy material, possessed of efficient insulating qualities and made from the pith or soft growth of the plant, and a layer or layers of strong, hard material made from the fibrous growth of the same plant.

It is understood that such plants as corn, sorghum or broom corn are composed of a hard, tubular, outer shell or casing having a siliceous coating, which is filled with a coarse cellular structure or porous pith full of sap, which when the sap has been extracted therefrom becomes a soft, spongy material full of air cells, and having excellent insulating qualities.

By means of suitable combing machinery which will be made the subject of a separate application, the soft and hard portions of the plant are separated and are separately shaped into flattened layers which can then be united in any desired combination of alternating layers, to form rigid unitary structures according to the use to which the product may be put.
This product is illustrated in the accompanying drawings, hereinafter more fully described and specifically pointed out in the claims.

In these drawings Fig. 1 is a plan of the board; Fig 2 is an end elevation showing a combination of a centrally disposed layer of pithy material, bound by or enclosed between, two layers of harder material; Fig. 3 is a similar view showing a central layer of hard material enclosed between two layers of soft, pithy material, which in turn are enclosed between two layers of hard fibrous material. In Fig. 4 the central layer is composed of the hard material and the external layers are composed of soft, pithy material and in Fig. 5 only two layers are shown, one being composed of soft material and the other composed of hard material.

In these views, A, A are the layers of soft pithy material referred to, which are supported by and reinforced by the layers B, B, of the hard, rigid fibrous material, which retain the soft layers in a flat extended condition, and which will retain nails or screws, by means of which the unitary structure can be attached to the supporting timbers of a wall.

These layers may be attached together with cementing material, and may be arranged in any desired combination of layers according to the manner of use, and amount of strength required.

In Figs. 2 and 4, three layers are shown. In Fig. 3 five layers are shown and in Fig. 5, two layers are shown. The hard layer may have a smooth surface which when exposed may be decorated with paint, stain or paper, and when the soft layer is exposed, it may be plastered upon or treated with asphalt or tar if waterproofing is desired.

The product can in this manner be employed for many useful purposes, such as for outside or inside wall surfaces, or for roofing material in which the joints may be cemented with asphalt, or for other building uses. In this manner a strong, durable, building material for building purposes is produced, and the cellular air-filled, soft or pithy layers provide a very efficient insulation for excluding heat or cold, and sound, and are adaptable for use in all climates, and are especially adapted for domestic architecture at a greatly reduced cost of materials and of labor in production, in comparison with the cost of natural lumber and its reduction to building material. Also the units may be constructed in wide sheets and hence can be more easily and quickly applied to the work than could lumber formed of natural wood.

In view of the description of the invention, what I claim as new and desire to secure by Letters Patent is:

1. A building material composed of layers of the hard fibrous material of the external casing of pithy plants, alternating with the layers composed of the internal pithy structure of said plants.

2. An article of manufacture consisting in, a wall board composed of a layer of the hard fibrous material from the outer shell of a plant having a pithy core, and a layer composed of the pithy substance of the same plant, said substances in each layer being cemented together with the natural gummy sap of said plant.

In testimony whereof I hereunto affix my signature this 8th day of July, 1926.

JAMES J. HINDE.